(12) United States Patent
May

(10) Patent No.: US 8,602,431 B1
(45) Date of Patent: Dec. 10, 2013

(54) RETRACTABLE TRUCK STEP WITH WIRELESS DOOR SENSOR

(71) Applicant: Richard P May, Yorba Linda, CA (US)

(72) Inventor: Richard P May, Yorba Linda, CA (US)

( * ) Notice: Subject to any disclaimer, the term of this patent is extended or adjusted under 35 U.S.C. 154(b) by 0 days.

(21) Appl. No.: 13/748,206

(22) Filed: Jan. 23, 2013

(51) Int. Cl.
*B60R 3/00* (2006.01)

(52) U.S. Cl.
USPC .......................................... 280/166; 280/163

(58) Field of Classification Search
USPC .................. 280/163, 166, 154.1, 169; 701/52
See application file for complete search history.

(56) References Cited

U.S. PATENT DOCUMENTS

| | | | |
|---|---|---|---|
| 6,100,793 A * | 8/2000 | Dimou | 340/426.1 |
| 6,641,158 B2 | 11/2003 | Leitner | |
| 6,830,257 B2 | 12/2004 | Leitner | |
| 6,834,875 B2 | 12/2004 | Leitner et al. | |
| 6,938,909 B2 | 9/2005 | Leitner | |
| 6,942,233 B2 | 9/2005 | Leitner et al. | |
| 7,007,961 B2 | 3/2006 | Leitner et al. | |
| 7,055,839 B2 | 6/2006 | Leitner | |
| 7,081,816 B2 | 7/2006 | Schebel et al. | |
| 7,163,221 B2 | 1/2007 | Leitner | |
| 7,380,807 B2 | 6/2008 | Leitner | |
| 7,398,985 B2 | 7/2008 | Leitner et al. | |
| 7,413,204 B2 | 8/2008 | Leitner | |
| 7,487,986 B2 | 2/2009 | Leitner et al. | |
| 7,566,064 B2 | 7/2009 | Leitner et al. | |
| 7,584,975 B2 | 9/2009 | Leitner | |
| 7,692,542 B2 | 4/2010 | Outzs | |
| 2006/0214386 A1* | 9/2006 | Watson | 280/163 |
| 2007/0194916 A1* | 8/2007 | Hewitt et al. | 340/545.6 |

* cited by examiner

*Primary Examiner* — John Walters
*Assistant Examiner* — James Triggs
(74) *Attorney, Agent, or Firm* — Kirk A. Buhler; Buhler & Associates

(57) ABSTRACT

Improvements using a wireless door sensor in each door to eliminate modifying a vehicle wiring and simplify installation of a retractable step and controller for the step. Up to four magnetic door sensors/transmitter are mounted on the edge of each door jamb. A magnet is mounted in the door jamb in proximity to the transmitter's magnetic sensor when the door is closed. Upon door movement the transmitter wakes and sends an open status message to a receiver where the message data is stored and the controller determines the correct responses. If a door on either side is opened the receiver/controller engages the appropriate step motor and lowers the step. The step remains lowered until the receiver stops receiving messages indicating that either door on a vehicle side is open or a transmitter of an open door has timed out and ceased transmissions.

19 Claims, 6 Drawing Sheets

RETRACTABLE TRUCK STEP WITH WIRELESS DOOR SENSOR

CROSS REFERENCE TO RELATED APPLICATION

Figure 1:
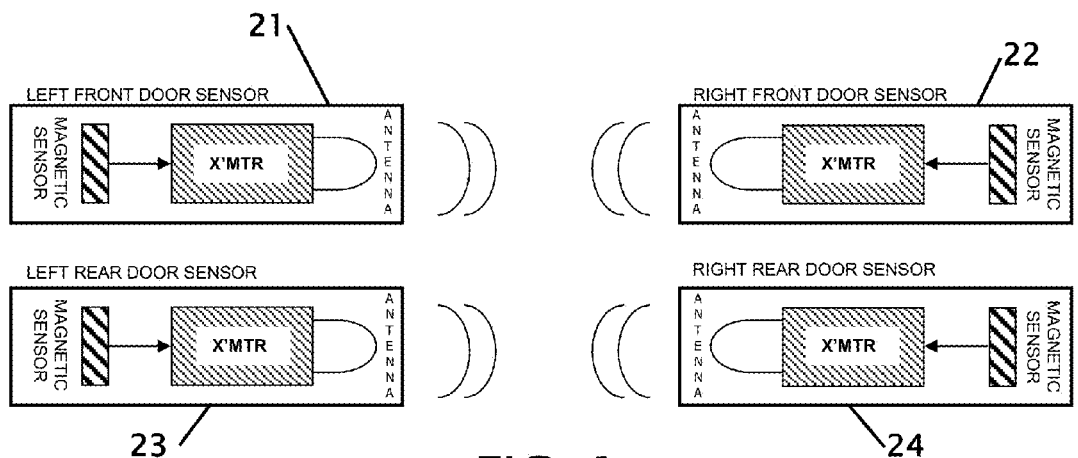

This application claims the benefit of Provisional Application Ser. No. 61/418,595 filed Dec. 1, 2010, and is a continuation-in-part to application Ser. No. 13/307,371 that was filed on Nov. 30, 2011 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention relates generally to a retractable/extendable step. More particularly, the present retractable step relates to a wireless signaling device located in or near a vehicle door to signal a vehicle step which is movable between a retracted or storage position and an extended position to provide a step to assist entry into the vehicle.

2. Description of Related Art Including Information Disclosed Under 37 CFR 1.97 and 1.98

High ground clearance vehicle such as trucks, SUV's and four wheel drive vehicle typically create a problem for people to get into because the distance between the ground and the floorboard of the vehicle can be great. To reduce the height of the step, fixed running boards are often installed. While the fixed running board makes entry into the vehicle easier the fixed running board defeats the purpose of the vehicle having high ground clearance. Another solution is to provide an extendable/retractable step. These steps are usually wired to the door switch of the vehicle to extend and retract the step based upon the status of the door switch. Wiring the step into the vehicle usually requires removal of door or interior panels to gain access to the switch wiring. Car dealers and new vehicle owners are often apprehensive to have the wiring of their new vehicles spliced or cut and possibly voiding the new car warranty. There is a need to provide a step signaling mechanism that minimizes disassembly of the interior of a vehicle and possibly violating the integrity of the vehicle wiring. Some patents have been published and issued on systems that describe signaling systems to extend and retract a truck step. Exemplary examples of patents covering these products are disclosed herein.

U.S. Pat. Nos. 6,942,233, 7,398,985, 7,413,204 and 7,584,975 issued to Horst Leitner disclose Retractable Vehicle Steps. These retractable vehicle steps require the installer to cut into the electrical system of a vehicle to obtain power for the retractable step and also require the installer to connect into the door switch on all the doors where the step will be extended. This requires running a significant amount of wiring to each door, to a controller and to the extension mechanism. Some of these patents also disclose using the key fob that unlocks the door to extend a step. While these patents disclose an extendable and retractable step, they either rely upon wiring the system into a door switch or the key fob that can leave a step extended until some signal that retracts the step(s).

U.S. Pat. No. 7,081,816 issued Jul. 25, 2006 to Dean David Schebal et al., discloses a Compact Wireless Sensor. The sensor is for placement in a door or window and sends a signal when the door or window is opened. The signal does not activate a step to extend or retract and further does not send a complimentary signal to indicate when the door or window has been closed. The device uses a timer to sample the state of the sensor and send updated information only when the timer initiates a reading and the status changes. This sensor is configured for installation within a wood door jamb and is not configured for installation into an automotive door.

U.S. Pat. No. 7,692,542 issued Apr. 6, 2010 to Allan Outzs discloses a Door Position Monitor that couples a magnetic field through the door to determine the status of the door. The sensor uses a wired connection to a magnetic reed switch to determine the status of the door. While this patent determines the status of the door it does not transmit a wireless signal to activate a step for entry or exit from a vehicle.

What is needed is a wireless sensor that can be glued, bonded or otherwise secured to or near a door of a vehicle to determine when a door is opened or closed to signal a step to extend or retract the step based upon the status of the door. Accordingly, a wireless sensor and transmitter to operate a vehicle step which overcomes the above-stated problems is desired.

BRIEF SUMMARY OF THE INVENTION

It is an object of the retractable truck step with wireless door sensor to signal a motor to extend and retract a step on an elevated vehicle. The automatic vehicle entrance and exit step lowers for use when a vehicle door is opened and retracted when the door is closed. The step is placed at an intermediary height between the ground and the floorboard of the elevated vehicle. A typical installation hardwires the motion of the step with the door switch.

It is an object of the retractable truck step with wireless door sensor to use a wireless signal to trigger the drive motor to extend or retract the step. The wireless system makes installation of the retractable truck step easier by eliminating opening door, side or door sill panels in order to run the wiring from the system through the door and to gain access to the door switch. Each door switch must be connected to move the steps separately on each side of a vehicle as well as the front and the rear doors on a 4-door vehicle.

It is an object of the retractable truck step with wireless door sensor for the sensor to operate in a sleep mode while it is not transmitting a signal. The sleep mode reduces power consumption and the wireless transmitter only turns on when the door is opened to extend the step. The step is retracted when either the door is closed or a five minute door open timeout is reached.

It is an object of the retractable truck step with wireless door sensor to use a redundant signal to extend and retract the step. The use of redundant signaling virtually eliminates the potential for operation of the step from stray signals or noise that is generated from mechanical noise or other wireless transmitters.

It is another object of the retractable truck step with wireless door sensor for the door sensors to be positioned at a plethora of locations on the door(s). Because the sensor is wireless it can be placed in a location that creates minimal cosmetic impact and protection from damage. The wireless feature allows installation to be performed by simply bonding, gluing or otherwise securing the sensor to each door or door jamb. This can be performed in a few minutes or less than 10 minutes for all doors instead of the up to an hour to locate and install on a vehicle with multiple door sensors.

It is still another object of the retractable truck step with wireless door sensor to use multiple command identifiers to differentiate one vehicle from another. The use of multiple ID codes reduces the potential of opening a door on a first vehicle and having the step of a second vehicle extend unexpectedly.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

Figure 2:
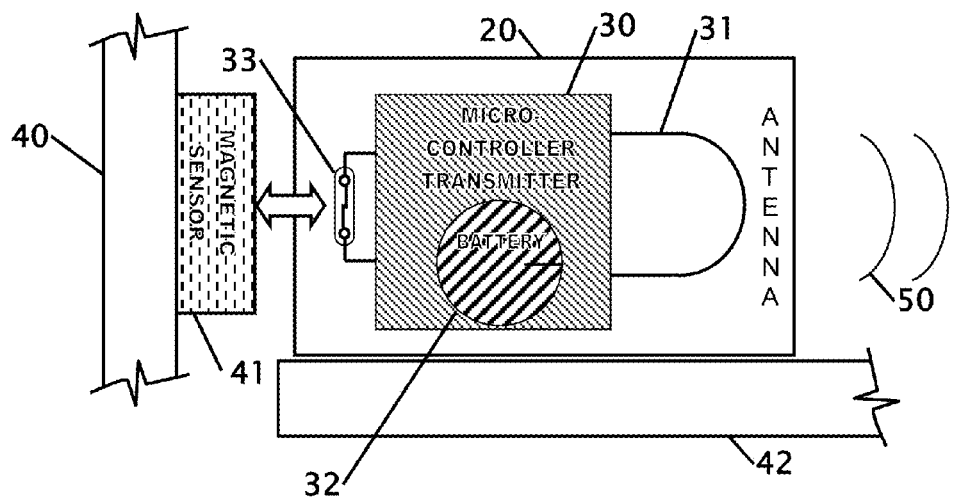
Figure 3:
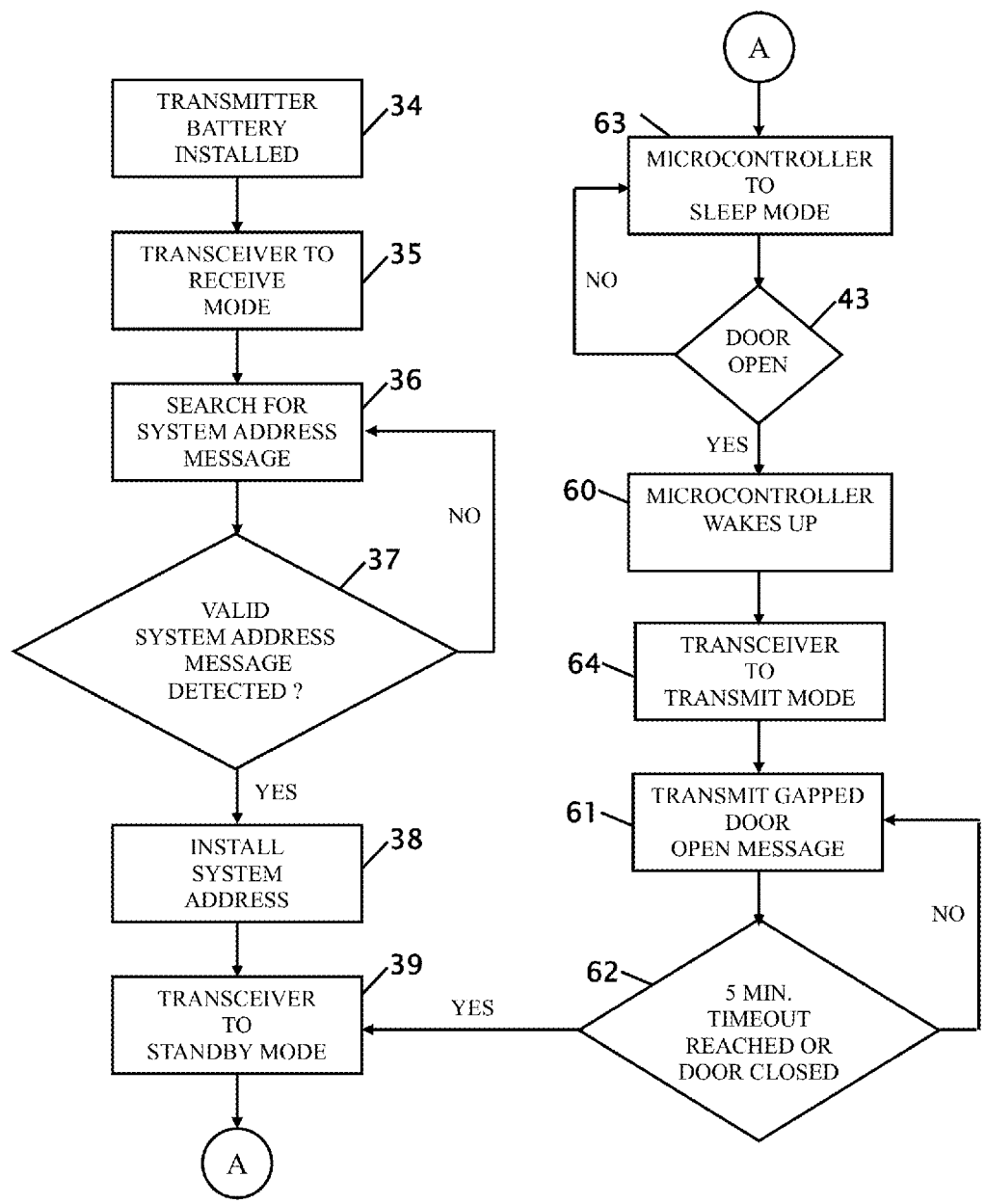
Figure 4:
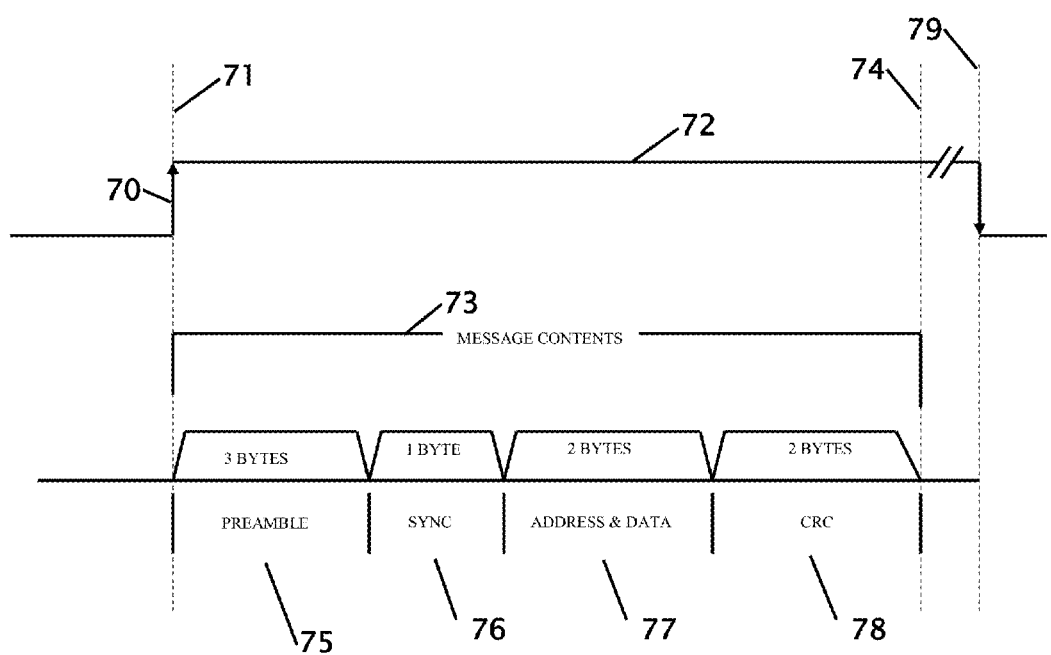
Figure 5:
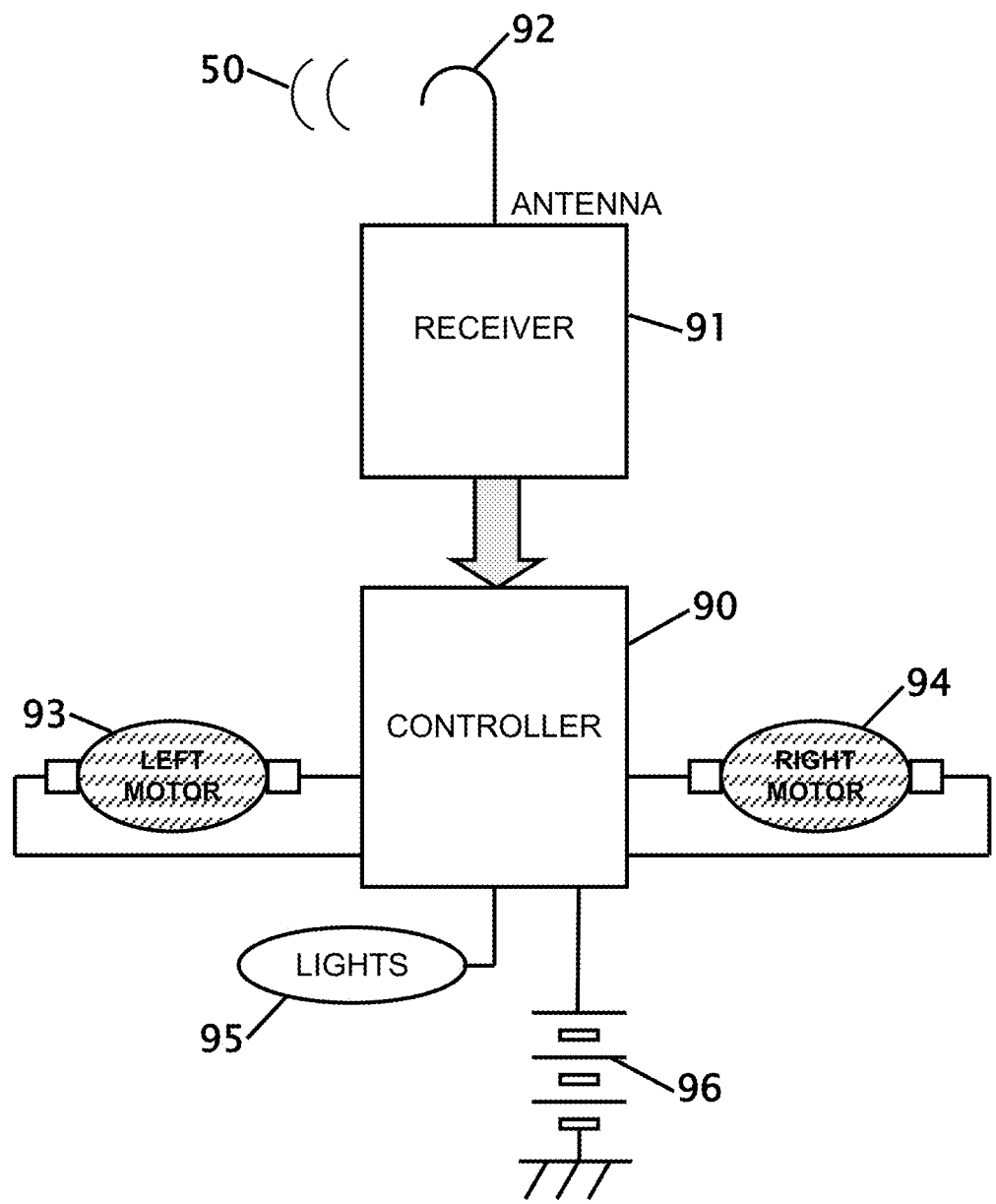
Figure 6:
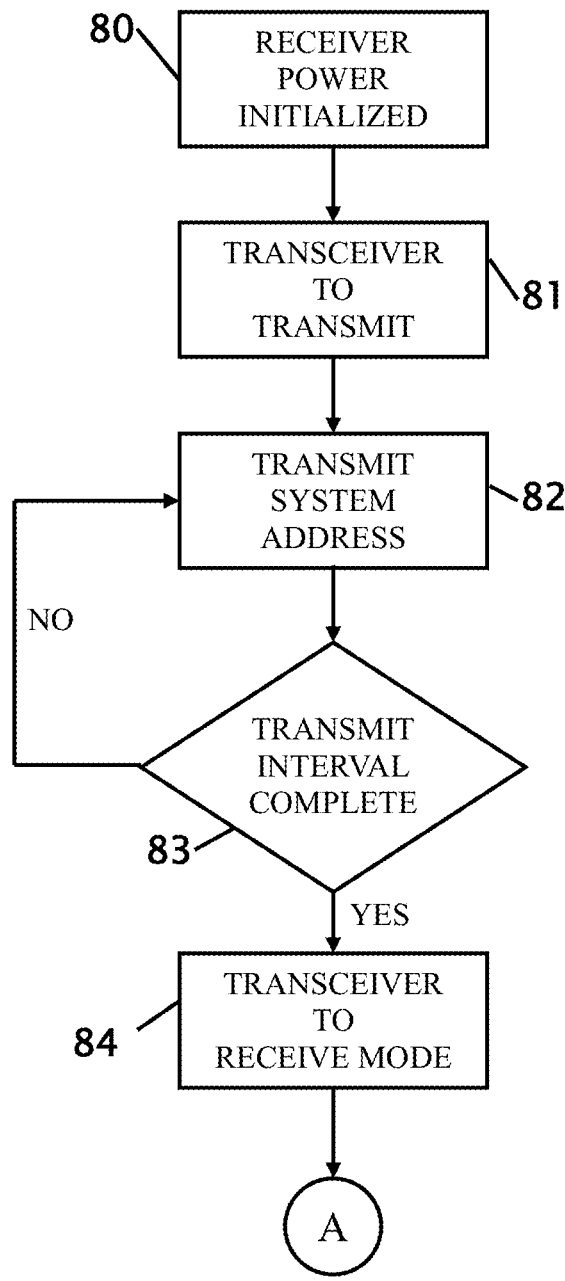
Figure 7:
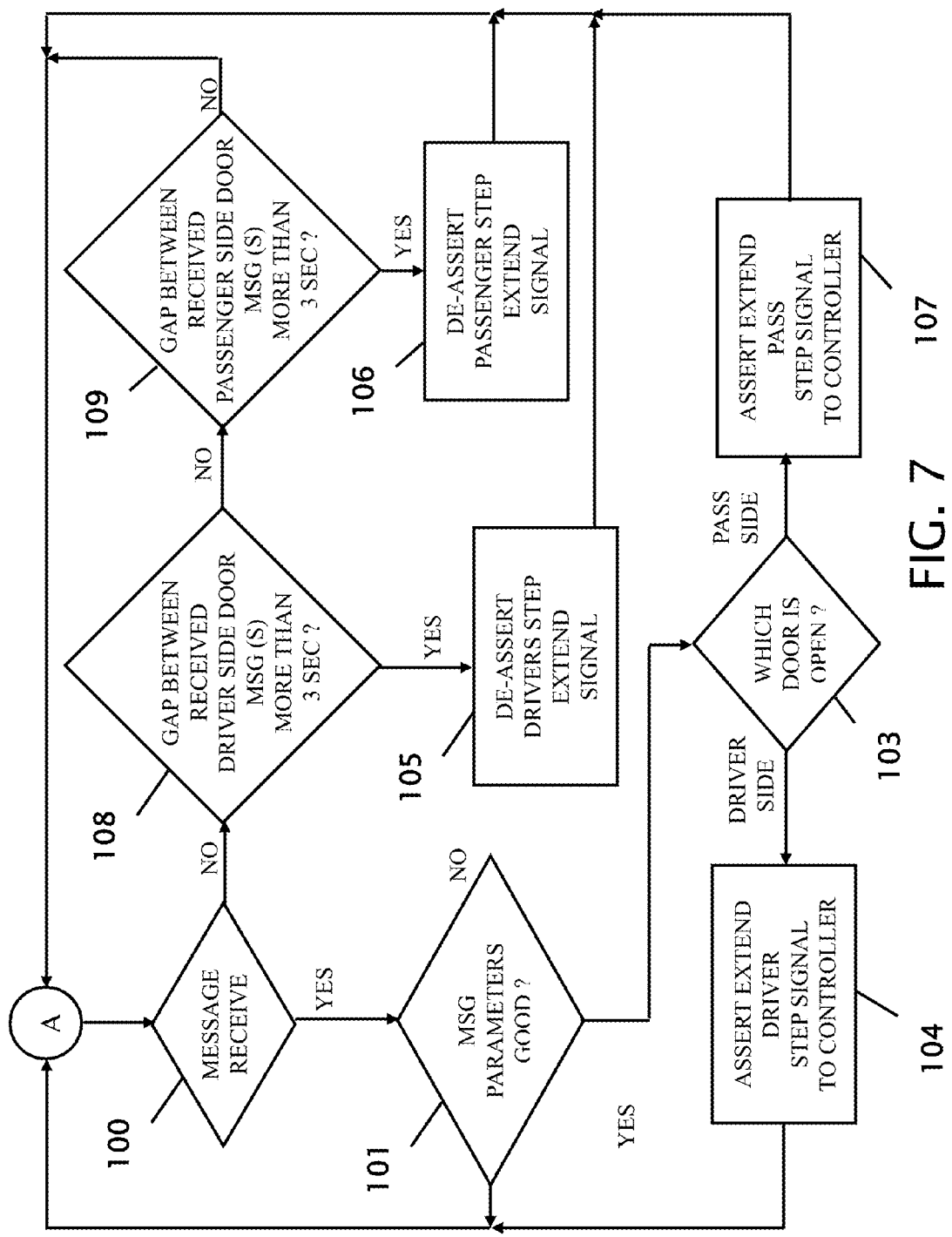

FIG. 1 shows four wireless door sensors.
FIG. 2 shows a detailed view of the wireless door transmitter.
FIG. 3 shows a block diagram of the code flow chart in the transmitter.
FIG. 4 shows the wireless message content from a door transmitter or receiver.
FIG. 5 shows block diagram of the receiver unit and the step controller motors.
FIG. 6 shows a block diagram of the code flow chart in the receiver.
FIG. 7 shows another block diagram of the code flow chart in the receiver.

DETAILED DESCRIPTION OF THE INVENTION

The Power Board is an automatic vehicle entrance and exit step that lowers for use when a vehicle door is opened and retracted when the door is closed. Traditional installation of the board requires modification of the vehicle to gain access to the door open switch wiring to sense door movement. Wiring is installed that accesses the vehicle wiring and is routed to a controller in the vehicle engine compartment. The controller engages the step motors to lower and retract the step.

FIG. 1 shows four wireless door sensors. A wireless car door sensor system eliminates the need to modify the vehicle wiring and simplify the installation of the power board is comprised of door sensors 21-24 installed on each door. For vehicles with only two doors, only a single left and right door sensor will be used. FIG. 2 shows a more detailed view of the internal and external components used in the sensor/transmitter.

FIG. 2 shows a detailed view of the wireless door transmitter. Each door sensor 20 consist of transmitter 30 coupled with reed switch 33 having contacts that are effected by the presence or absence of a magnetic field caused by a magnet 41. The magnet 41 or the magnetic sensor 20 is mounted on the edge of each door 42 opposing the door jamb 40. The magnet 41 is mounted in the door jamb 40 that comes in close proximity to the transmitter's magnetic sensor 33 when the door 42 is closed. The effective range of most reed switches 33 is one inch or less and is based upon the strength of the magnetic field that is created or coupled by the magnet 41. This figure and the description show and describe a preferred embodiment for orientation, location and placement. Other embodiments are also contemplated that will provide the equivalent result of signaling when a car door has been opened and closed. The method of securing the transmitter 20 and or the magnet 41 can be as simple as tucking the components under body panels to gluing, bonding or screwing the components to a vehicle.

A battery 32 is included with the transmitter 20 along with an antenna 31 that transmits 50 a signal based upon the status of the sensor 33. The transmitter 20 operates in a low power sleep mode until the magnetic sensor 33 senses a movement of the magnet 41. FIG. 3 shows a flow chart of the general operations within the microcontroller-transmitter 40.

FIG. 3 shows a block diagram of the code flow chart in the transmitter. Door transmitters incorporate a transceiver to facilitate message reception and transmission. Transmitter manufacturing does not include the installation of a system address. Address installation is accomplished after the battery 32 is installed in the transmitter 34. Upon battery installation 34 the transceiver goes into a receive mode 35 and searches for a valid 37 system address message 36 from the transmitter. When the transceiver receives a valid system address message 37 the transceiver will store the first or new system address 38. The transmitter will then enter into a standby mode 39. Subsequent to address message reception the system address parameter is automatically installed in the transmitter software to be used for the "door open" transmitted messages. The transmitter transitions to a low power sleep mode 63 after system address installation. The transmitter operates in a low power sleep mode until a door is moved 43. Since the sensing distance of the preferred reed switch sensor is limited, the detection of movement of the door is generally limited to motion when a door is just being opened and when the door latches shut.

The opening and closing of the door 43 changes the status of the sensor and wakes up 60 the microcontroller from sleep. After the microcontroller wakes up 60 it will detect the status of the door 61 and determine if the door is opened 62. If the door is opened 43 the microcontroller will initiate the transmission of door open messages 64. If the door is now closed the microcontroller will cease open door message transmissions. After the opened 64 command has been transmitted the microcontroller will repeat gapped open door messages until either the door is closed or a five minute time out period 62 is reached after which the microcontroller will re-enter the sleep mode.

FIG. 4 shows the wireless data transmission from a transmitter. The opening 71 of a door will change the status of the sensor and trigger 71 the microcontroller to awaken to send the message contents 73. The microcontroller will remain awake 72 until the door closes 79. The microcontroller will determine the status of the door sensor switch and turn on the transmitter to begin transmission of the signal. The transmission of the data begins with a preamble 75 followed by a synchronization word 76. System address 77 and data words follow the synchronization word with the message terminated with a cyclic redundancy check (CRC) 78. The system address word ranges from 10 to 255 to reduce the possibility that opening the door of a first vehicle will inadvertently extend the step of both the desired first vehicle and an undesirable second vehicle. The data also includes a status indicator of the door and the status of the door. After transmission 74, the transmitter will insert message gaps to allow the other door transmitters to transmit their message data.

FIG. 5 shows block diagram of the receiver unit and the step controller motors. Upon initial receiver power application during system installation the receiver transitions to a transmit mode to send the system address message to the door transmitters. The receiver enters the normal receive mode after the system address message has been transmitted for the initialization interval. After address installation the receiver 91 receives the wireless command 50 from an antenna 92 and communicates the decoded command to a microcontroller 90. The receiver interfaces to a controller that provides the signals necessary to raise and lower the step and to control the step lighting. The receiver 91 is installed underneath the vehicle where it is wired to the controller and battery 96.

FIG. 6 shows a block diagram of the code flow chart in the receiver and FIG. 7 shows another block diagram of the code flow chart in the receiver. Upon initial power 80 application the receiver initiates the transmission 81 of the system address message 82 to the door transmitters until the transmission interval is complete 83. After the transmit interval is complete the transceiver will revert to a receive mode 84.

After the system address transmission interval the receiver listens to receive the messages 100 and determines if the received signal parameters are valid 101. If the data is found to be invalid the microcontroller will not take any action and return to a listen state. Messages that are determined to be valid will be decoded to determine which door changed state 103 and will branch to either the driver 104 or passenger 107 door to determine the status of the door to command the controller to retract or extend 105, 106 the appropriate step. The two or four door transmitters, stores the message data, transmit the message data while the door is open until the five minute timeout elapses. If a door on either side of the vehicle is open the receiver asserts the proper signal to the controller to engage the appropriate step motor and lower the step. A message is sent at intervals of less than three (3) seconds. If a gap of transmission of more than three seconds 108, 109 is detected the associated door step will raise. A step will remain lowered until the receiver receives messages indicating that both doors on a vehicle side are closed. While time intervals of three seconds and five minutes are indicated the intervals can be shorter or longer. The transmission is sent at intervals because at the transmission frequency FCC requirement require that the burst of signal must be followed by a non-transmission period to allow other devices to operate at the same period. The transmission repeats at an interval to identify that it is desirable for the step to remain extended as long as the transmission is being periodically sent. The time period of three seconds is preferred but a time interval of between ½ second and five seconds works equivalently.

Thus, specific embodiments of a retractable truck step with wireless door sensor have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A retractable truck step with wireless door sensor comprising:
   at least one motor that extends and retracts at least one automated vehicle entrance and exit step;
   at least one sensor that detects the when a door is opened;
   said sensor emitting a wireless signal to a receiver when said door is opened;
   a receiver that receives said emitted wireless signal to operate said motor, and
   wherein said emitted wireless signal transmits a redundant signal to said receiver while said door is opened.

2. The retractable truck step with wireless door sensor according to claim 1 wherein said sensor is a magnetic reed switch.

3. The retractable truck step with wireless door sensor according to claim 1 wherein said emitted wireless signal includes multiple transmission addresses.

4. The retractable truck step with wireless door sensor according to claim 1 wherein said wireless signal is sent at a timed interval to identify that the door is still open.

5. The retractable truck step with wireless door sensor according to claim 4 wherein said timed interval is 0.1 to 5 seconds.

6. The retractable truck step with wireless door sensor according to claim 1 wherein said transmitter stops transmitting door open signal after a finite period of time.

7. The retractable truck step with wireless door sensor according to claim 6 wherein said finite period of time is between one minute and 15 minutes.

8. The retractable truck step with wireless door sensor according to claim 4 wherein said receiver detects an absence of signals from said sensor.

9. The retractable truck step with wireless door sensor according to claim 8 wherein said absence of signals is between 0.5 seconds and five seconds.

10. The retractable truck step with wireless door sensor according to claim 1 wherein more than one at least one sensor is used.

11. The retractable truck step with wireless door sensor according to claim 1 wherein said separate sensors are placed at a driver door and at a passenger door of said vehicle.

12. The retractable truck step with wireless door sensor according to claim 1 wherein said separate sensors are placed at each driver side door and at each passenger side door of said vehicle.

13. The retractable truck step with wireless door sensor according to claim 1 wherein said wireless signal is at a frequency of 915 MHz.

14. The retractable truck step with wireless door sensor according to claim 1 wherein said wireless signal includes vehicle ID information.

15. The retractable truck step with wireless door sensor according to claim 1 wherein said sensors are magnetic door sensors.

16. The retractable truck step with wireless door sensor according to claim 1 wherein sensors are mounted on the edge of a door jamb.

17. The retractable truck step with wireless door sensor according to claim 1 wherein separate at least one automated vehicle entrance and exit step is placed at a driver side of said vehicle and at a passenger side of said vehicle.

18. The retractable truck step with wireless door sensor according to claim 1 that does not utilize a wired connection between said at least one sensor and a controller.

19. The retractable truck step with wireless door sensor according to claim 18 wherein said controller operates said at least one motor that extends and retracts said at least one automated vehicle entrance and exit step.

* * * * *